United States Patent
Kubo et al.

[11] Patent Number: 5,826,681
[45] Date of Patent: Oct. 27, 1998

[54] DISK BRAKE ASSEMBLY WITH PISTON RETRACTION SEAL

[75] Inventors: Atsushi Kubo; Atsuo Matsumoto, both of Itami, Japan

[73] Assignee: Sumitomo Electric Industries, Ltd., Osaka, Japan

[21] Appl. No.: 704,246

[22] Filed: Aug. 28, 1996

[30] Foreign Application Priority Data

Sep. 1, 1995 [JP] Japan .................................. 7-225461

[51] Int. Cl.$^6$ .................................................. F16D 55/02
[52] U.S. Cl. ........................ 188/71.8; 188/72.4; 277/177
[58] Field of Search ................. 188/71.8, 72.3, 188/72.4, 73.1, 196 P, 322.18; 277/165, 177, 227, 180, 207 R

[56] References Cited

U.S. PATENT DOCUMENTS

| | | | |
|---|---|---|---|
| 2,360,734 | 10/1944 | Smith | 277/177 X |
| 2,360,735 | 10/1944 | Smith | 277/177 X |
| 3,377,076 | 4/1968 | Burnett | 188/71.8 X |
| 3,582,093 | 6/1971 | Lucien | 277/177 X |
| 3,655,204 | 4/1972 | Sievenpiper | 277/24 |
| 4,352,498 | 10/1982 | Burke et al. | 277/177 X |
| 4,387,901 | 6/1983 | Ritsema | 188/71.8 X |
| 4,526,383 | 7/1985 | Fuchs et al. | 277/152 |
| 4,796,858 | 1/1989 | Kabel | 277/165 X |
| 5,325,940 | 7/1994 | Rueckert et al. | 188/71.8 |

FOREIGN PATENT DOCUMENTS

| | | |
|---|---|---|
| 59058241 | 4/1984 | Japan . |
| 2-12291 | 3/1990 | Japan . |
| 5133429 | 5/1993 | Japan . |
| 6249275 | 9/1994 | Japan . |
| 2 022 770 | 12/1979 | United Kingdom . |
| 2 129 878 | 5/1984 | United Kingdom . |

*Primary Examiner*—Peter M. Poon
*Attorney, Agent, or Firm*—Wenderoth, Lind & Ponack, L.L.P.

[57] ABSTRACT

A disk brake assembly has a piston retraction structure which can keep the space between the pad and the disk constant while the brake is not being applied by varying the distance the piston is retracted with the fluid pressure applied to the disk brake. The piston retraction structure has a piston seal fitted in a seal groove formed in the inner surface of a cylinder of a caliper. When a piston is advanced under fluid pressure, the piston seal is pulled by the piston and deformed until it fills up the gap defined by a chamfer formed along the edge of the seal groove. When the fluid pressure is removed thereafter, the piston is retracted by the resilient restoring force of the deformed piston seal. The piston seal is made of a rubber having a hardness of 80 IRH or more. In another arrangement, the piston seal has its outer-diameter portion fitted in the seal groove with a zero gap or with an interference. By further adjusting the size of the chamfer, it is possible to vary the distance the piston is retracted with the fluid pressure in an ideal manner.

5 Claims, 7 Drawing Sheets

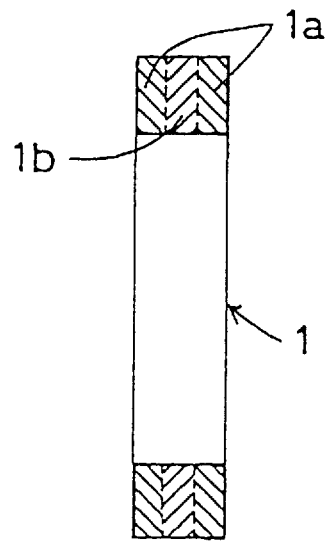
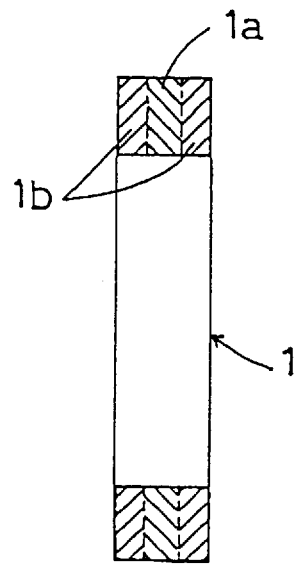
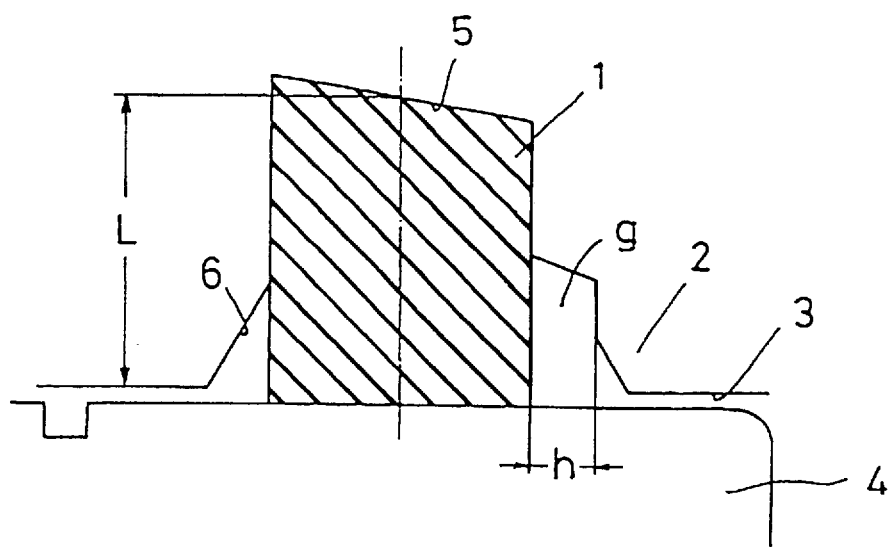

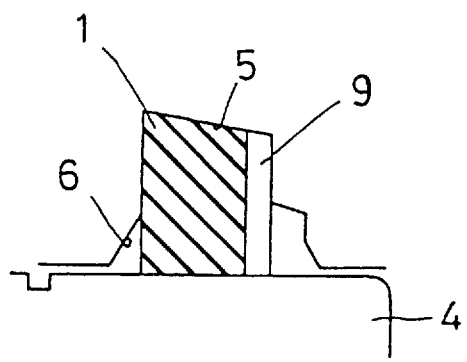
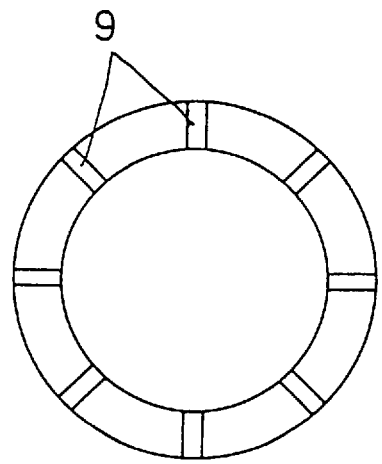
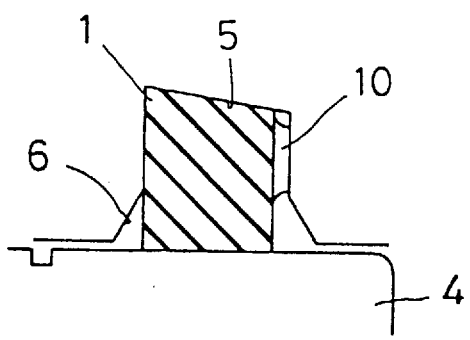
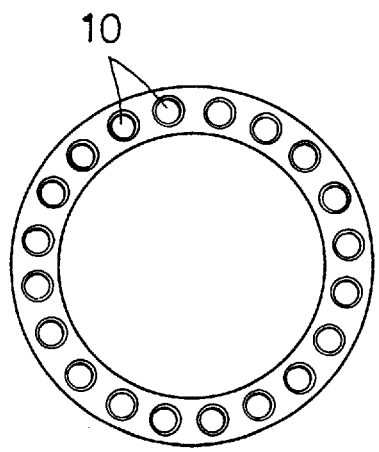

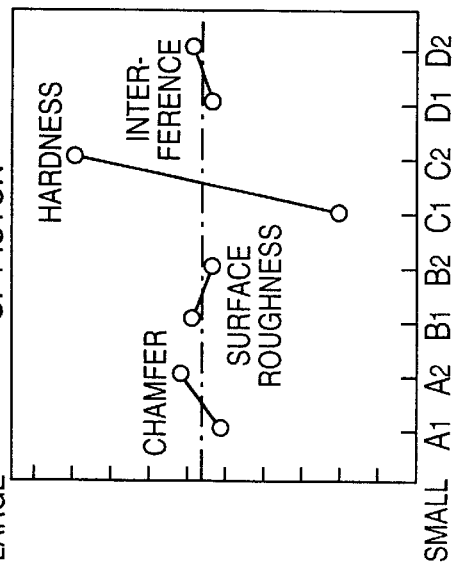
FIG. 10B CHANGE IN RETRACTION OF PISTON
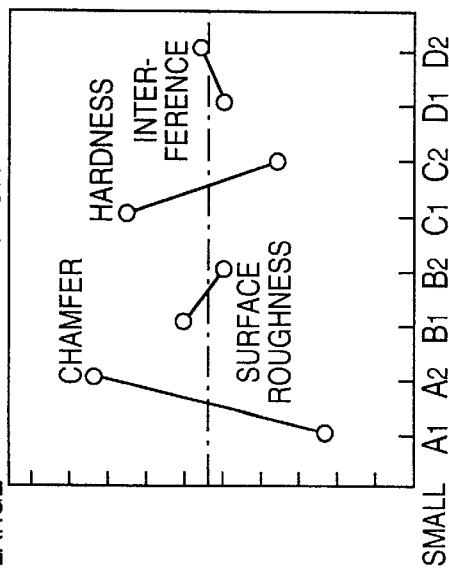
FIG. 10A RETRACTION OF PISTON
| A1 | SEAL GROOVE WITH SMALL CHAMFER |
| A2 | SEAL GROOVE WITH LARGE CHAMFER |
| B1 | SEAL GROOVE WITH ROUGH SURFACE |
| B2 | SEAL SURFACE WITH FINE SURFACE |
| C1 | PISTON SEAL WITH LOW HARDNESS |
| C2 | PISTON SEAL WITH HIGH HARDNESS |
| D1 | PISTON SEAL WITH WEAK INTERFERENCE |
| D2 | PISTON SEAL WITH STRONG INTERFERENCE |

DISK BRAKE ASSEMBLY WITH PISTON RETRACTION SEAL

BACKGROUND OF THE INVENTION

This invention relates to a disk brake assembly with a piston retraction mechanism for use in an automobile or a motorcycle or for industrial use.

An ordinary hydraulic disk brake has a piston retraction means having a rubber ring called a piston seal. When the brake pressure is released, the piston seal as the retraction means, retracts a brake piston (hereinafter simply "piston") which has been pushed out to press a friction pad (hereinafter simply "pad") against a disk rotor (hereinafter simply "disk") for braking.

As shown in FIGS. 1A and 1B, the piston seal 1 of the piston retraction means is received in a seal groove 5 formed in the inner surface of a cylinder 3 defined in a caliper 2 and pressed against a outer periphery of the piston 4 inserted in the cylinder 3. The edge of the groove 5 on the side remote from the fluid pressure receiving end of the piston (and near to the disk) is chamfered (as shown at 6 in FIG. 1B).

As the piston 4 is advanced, the piston seal 1 is resiliently deformed at its inner-diameter portion until the gap defined by the chamfer 6 is filled up with the seal 1, as shown in FIG. 2B. When the fluid pressure is removed, the piston seal 1 springs back to its original shape, while retracting the piston 4 as shown in FIG. 2C.

If the piston 4 is advanced further from the position shown in FIG. 2B, slip occurs between the seal 1 and the piston 4, thus preventing further deformation of the piston seal 1 regardless of the degree of wear of the pad. This makes it possible to retract the piston under the same conditions at all times.

For reasons which will be described later, the distance the piston is retracted has to be determined according to the specifications of the disk brake. Heretofore, this distance was adjusted by changing the size of the chamfer 6 formed on the edge of the groove 5 near the disk (W in FIG. 2A). This arrangement has the following problems.

The degree of deflection of the caliper when subjected to brake pressure and the degree of deformation of the pad due to compression vary with the specifications of the brake. FIG. 9 shows the relationship between the distance the piston is retracted and the fluid pressure P, which affects the degree of deformation of the pad due to compression and the degree of deflection of the caliper, in a given type of brake.

It is necessary that the distance the piston is retracted is increased with the degree of deformation of the pad and the degree of deflection of the caliper. Curves C1 and C2 in FIG. 9, which are almost straight lines with small gradients, show the distance the piston is retracted by conventional piston retraction means. These lines are widely deviated from curve A, which shows an ideal relation between the piston retracting distance and the fluid pressure (showing a minimum necessary piston retracting distance).

In the conventional arrangement, even when the fluid pressure is so low that the piston has not advanced the distance W in FIG. 2A, the piston seal itself tends to move to the position shown in FIG. 2B, urged by the fluid pressure. When the fluid pressure is removed thereafter, the piston is retracted by the distance W by the piston seal. Thus, while the fluid pressure is low, the distance the piston is retracted tends to be greater than the distance it is advanced.

On the other hand, even when the fluid pressure increases and the piston is advanced a distance greater than the distance W, the piston seal cannot be deformed beyond the state shown in FIG. 2B. Thus, when the fluid pressure is removed, the piston is retracted by the piston seal only by the distance W or a slightly larger distance than W. That is, when the fluid pressure is higher than a predetermined value, the distance the piston is retracted is almost constant and is smaller than the distance it is advanced. It is thus impossible to increase the distance the piston is retracted substantially in proportion to the fluid pressure.

For example, if the distance the piston is retracted is represented by curve C1, the piston will be retracted excessively while the fluid pressure is lower than P1, and will be retracted insufficiently while it is higher than P1. In the case of curve C2, the distance the piston is retracted is excessive in the region where it is lower than P2 and insufficient in the region where it is higher than P2.

If the piston is retracted insufficiently, the pad may remain in contact with the piston after the brake has been released, thus increasing the dragging torque. If the piston is retracted excessively, a large space will be formed between the pad and the piston while the brake is not applied. This increases the play of the brake pedal (invalid stroke) and worsens the pedal feel.

Unexamined Japanese Patent Publications 5-1334293 and 6-249275 propose solutions to this problem. But some of these solutions have a problem in that the piston retracting distance does not change along the ideal curve in a wide range of fluid pressure, and others need a large number of parts and are too complicated in structure.

SUMMARY OF THE INVENTION

An object of the present invention is to provide a disc brake assembly having a piston retraction means which can easily and reliably retract the piston so that the actual piston retraction curve substantially coincides with the ideal curve.

According to a present invention, the rubber piston seal has a hardness of 80 IRH (International rubber hardness) or more. Alternatively, an outer-diameter portion of the piston seal (that accounts for 25–70% of the depth of the seal groove) is fitted in the seal groove with substantially zero axial gap or with a suitable interference. In this arrangement, the rubber hardness of the seal may be less than 80 IRH.

The term "depth of the seal groove" used herein to the depth L (FIG. 6) measured at the center of the seal groove. The term "suitable interference" means an axial compression up to about 15%.

The piston seal according to the present invention may be formed entirely from a rubber material having a hardness of 80 IRH or more, or may comprise a hard portion having a hardness of 80 IRH or more and a soft portion integral with the hard portion and having a hardness of less than 80 IRH (e.g. substantially the same hardness as a conventional piston seal).

In the latter arrangement, the soft portion may be provided to cover the inner and outer peripheral surfaces of the ring or the entire surface of the ring, or the hard portion and the soft portion may be arranged in an axial direction of the piston seal. In the latter or second arrangement, the hard portion may be provided at one end of the seal and the soft portion may be at the other end. Otherwise, one of the soft and hard portions may be sandwiched between two divided parts of the other. Between the adjacent hard and soft portions, the hardness may change in steps or continuously.

According to the present invention, the piston seal is provided with an air vent that extends from the inner periphery side of the piston seal to the outer periphery of the piston.

In order to make the actual piston retraction curve substantially coincident with the ideal curve, it is necessary to reduce the distance the piston is retracted while the fluid pressure is low (initial value) and to increase the rate at which the distance the piston is retracted with increases of the fluid pressure (shown by gradients of the curves C1 and C2 shown in FIG. 9). There are four factors that determine the distance the piston is retracted, namely, size of the chamfer formed along the edge of the seal groove, hardness of the material of the piston seal, roughness of the contact surfaces of the piston and the piston seal, and diametric compression rate of the piston seal (interference).

We evaluated these factors to determine which of them actually have a greater influence on the distance the piston is retracted and the rate at which the piston retracting distance increases with the fluid pressure. The results of evaluation are shown in FIG. 10. The piston retracting distance and its rate of change were evaluated within a range of 0–140 $kgf/cm^2$, taking into account the braking fluid pressure in an automobile.

From these results, it is apparent that the piston retracting distance and its rate of increase are mainly influenced by the size of the chamfer formed on the seal groove and the hardness of the piston seal.

According to the present invention, the piston seal has a hardness of 80 IRH or more. Such a piston seal is high in rigidity, so that the degree of deformation is low while the fluid pressure is low. Thus, the leveling tendency of the piston retracting distance is suppressed, so that the piston retracting distance increases with the fluid pressure at an increased rate.

As seen in FIG. 10, the distance the piston is retracted decreases with the hardness of the piston seal. But by adjusting the size of the chamfer formed along the edge of the seal groove, it is possible to retract the piston by a necessary distance within a wide range of fluid pressure.

The contact resistance between the rubber piston seal and the metallic piston decreases with increase in the hardness of the seal, so that the sealing ability of the seal drops. Also, the lower the contact resistance, the more the piston is likely to slip when retracted. If it slips, the piston would not be retracted sufficiently. In order to maintain high contact resistance and sealing ability, the piston seal has its sealing surface and its contact surface with the piston formed partially or entirely from a soft material having a hardness lower than the hard portion (e.g. substantially the same hardness as a conventional seal ring).

In the arrangement in which the outer-diameter portion of the piston seal is fixed in the seal ring (i.e. to the cylinder), only the inner-diameter portion is deformable, so that the overall rigidity of the seal increases as with the piston seal made of a hard rubber. Such a ring is less deformable when the brake is applied. It is thus possible to prevent the piston seal from being deformed, as urged by the fluid pressure, until it fills up the gap defined by the chamfer, even while the fluid pressure is so low that the piston has not advanced by the distance equal to the width of the chamfer. Also, since the seal is fixed at its outer-diameter portion, it can retract the piston quickly and reliably to its original retracted position. Thus, even if the brake pedal is depressed repeatedly at a quick pace, the brake stroke changes little, so that the driver can get unchanged pedal feelings.

BRIEF DESCRIPTION OF THE DRAWINGS

Other features and objects of the present invention will become apparent from the following description made with reference to the accompanying drawings, in which:

FIG. 5A is a sectional view of a piston seal having a hard portion sandwiched between soft portions;

FIG. 5B is a sectional view of a piston seal having a soft portion sandwiched between hard portions;

FIG. 6 is a partial enlarged sectional view of a brake in which the piston seal has its outer-diameter portion fixed in the seal groove;

FIG. 7A is a sectional view of the piston seal shown in FIG. 6 in which grooves are formed;

FIG. 7B is a back view of the grooved piston seal shown in FIG. 7A;

FIG. 8A is a sectional view of the piston seal shown in FIG. 6 provided with protrusions;

FIG. 8B is a back view of the piston seal shown in FIG. 8A;

FIGS. 10A–10B are graphs showing the degree of influence of various factors on the piston retracting distance and its rate of change.

DETAILED DESCRIPTION OF THE PREFERRED EMBODIMENT

Now referring to FIGS. 1–8, description is made of a disk brake with a piston retraction means embodying the present invention.

Figure 1A:
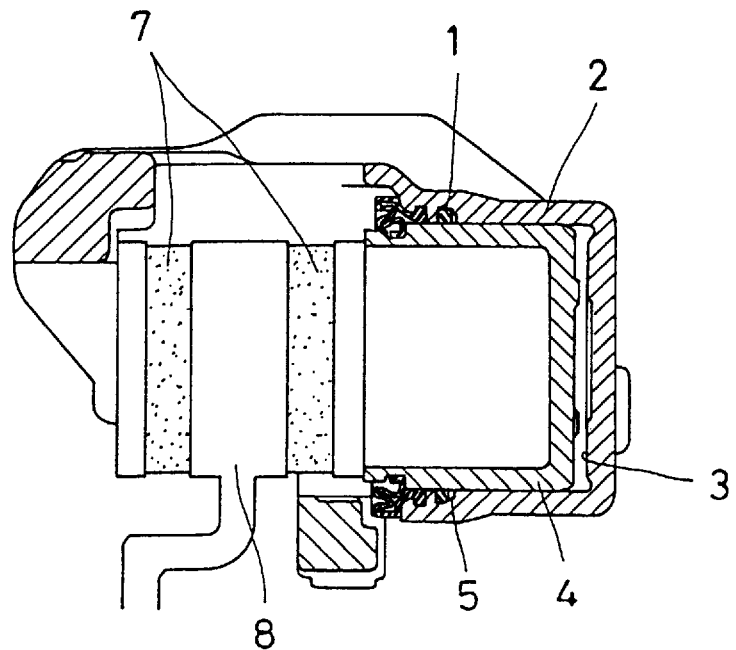
FIG. 1A is a sectional view of a floating disk brake.
Figure 1B:
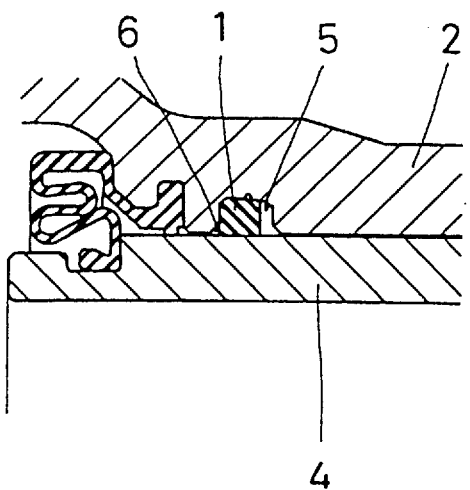
FIG. 1B is an enlarged view of a piston retraction means in the disk brake shown in FIG. 1A.

FIG. 1A shows a floating disk brake. It has a caliper 2 and a piston 4 inserted in a cylinder 3 formed in an inner side of the caliper 2. An annular piston seal 1 is fitted in a seal groove 5 formed in the inner surface of the cylinder 3. The piston seal 1 is fitted on outer periphery of the piston 4 with an interference to liquid-tightly seal the outer periphery of the piston 4. In FIG. 1A, numerals 7 and 8 indicate a pad and a disk, respectively.

A chamfer 6 having a width W (shown in FIG. 2) is formed along one of the side edges of the seal groove 5 remote from the fluid pressure receiving end of the piston.

For the structural features thus far described, the disk brake according to the present invention is the same as a conventional disk brake with a piston retraction means. The brake according to the present invention differs from the conventional one in that the piston seal 1 has a hardness of 80–95 IRH, while a conventional piston seal had a hardness of about 60–75 IRH.

The hardness of the piston seal 1 should be not less than 80 IRH to achieve the effect of the invention. The upper limit should be 95 IRH to maintain the function as a seal.

Figure 2A:
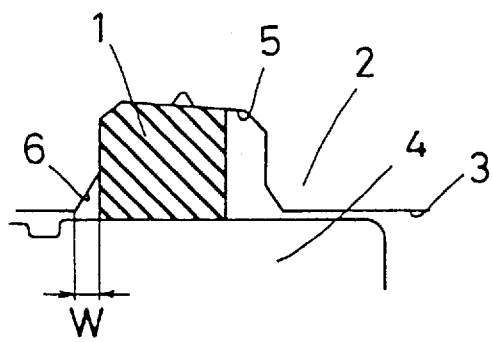
FIGS. 2A–2D are views showing the movement of a piston seal when no fluid pressure is applied (FIG. 2A), when the fluid pressure is applied (FIG. 2B), when the fluid pressure is removed (FIG. 2C), and when the fluid pressure is low in the arrangement of the present invention (FIG. 2D)
Figure 2B:
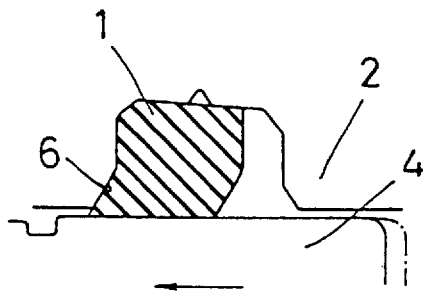
Figure 2C:
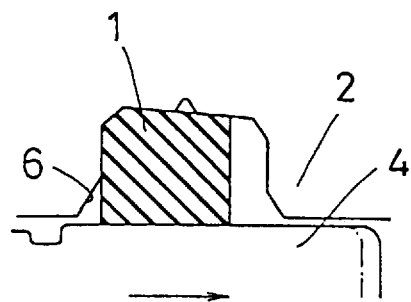

In the conventional arrangement, the hardness (and thus the rigidity) of the piston seal is so low that the piston seal 1 tends to move to fill up the gap defined by the chamfer 6 as shown in FIG. 2B even while the fluid pressure is low and thus the piston is advanced only a little.

Figure 2D:
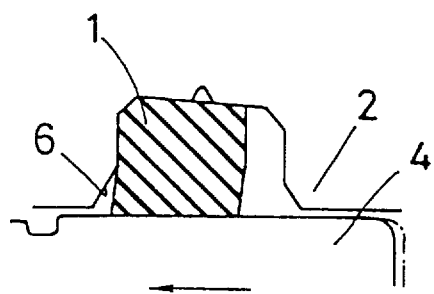

In the arrangement of the present invention, the seal 1 is sufficiently hard and rigid so that while the fluid pressure is low, it is deformed only slightly, especially at its inner-diameter portion (see FIG. 2D). When the piston 4 moves further to the left from the position shown in FIG. 2D under increased fluid pressure, the piston seal 1 will be deformed until it is restricted by the chamfer 6, to such a degree of deformation corresponding to the fluid pressure. Thus, the distance the piston is retracted increases linearly as the fluid pressure increases.

Figure 3A:
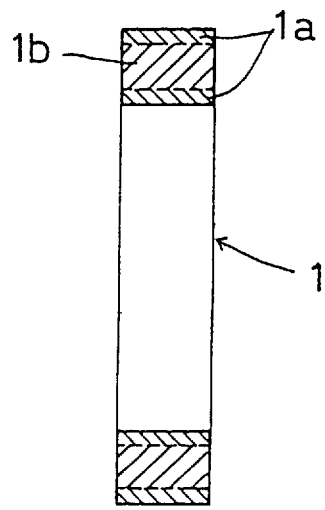
FIG. 3A is a sectional view of a piston seal having soft portions at its inner and outer peripheries.
Figure 3B:
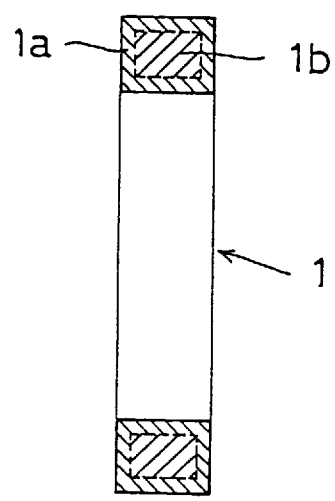
FIG. 3B is a sectional view of a piston seal having its entire surface layer formed from a soft rubber.
Figure 4:
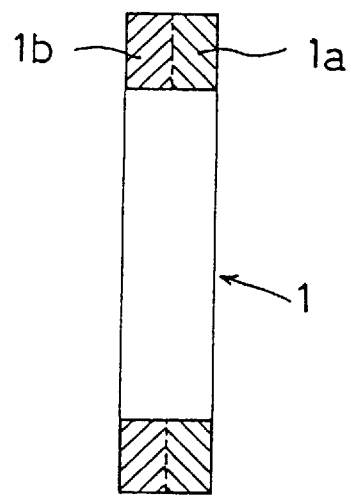
FIG. 4 is a sectional view of a piston seal comprising a soft portion and a hard portion arranged in the axial direction of the seal.
Figure 9:
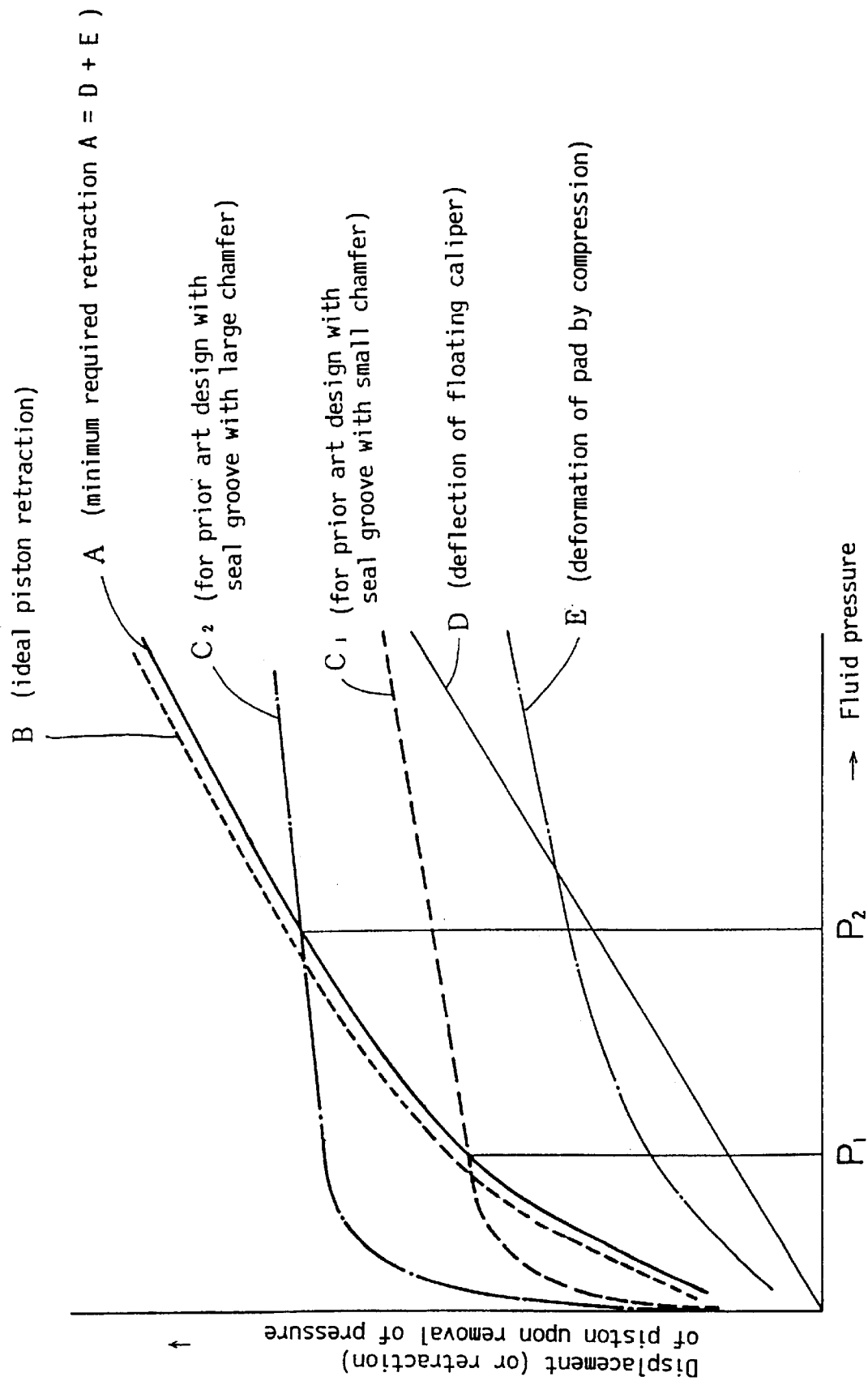
FIG. 9 is a graph showing the relationship between the distance the piston is retracted and the fluid pressure in conventional arrangements.

FIGS. 3–5 show embodiments in which the piston seal comprises a hard portion and a soft portion integral with the hard portion. The soft portion is provided to prevent the contact resistance with the piston and sealing properties from dropping due to high hardness of the rubber piston seal.

The piston seals shown in FIGS. 3–6 have at least one soft portion 1a and at least one hard portion 1b. The soft portion 1a has a hardness of less than 80 IRH, while the hard portion 1b has a hardness of 80 IRH or more. This is the same for the subsequent embodiments. The piston seal shown in FIG. 3A comprises an inner soft portion 1a pressed against the piston, an outer soft portion 1a pressed against the bottom of the seal groove, and a hard portion 1b sandwiched between the inner and outer soft portions 1a.

The piston seal 1 shown in FIG. 3B comprises a hard portion 1b as a core and a soft portion 1a completely surrounding the four sides of the hard portion 1b. The piston seal 1 shown in FIG. 4 comprises a soft portion 1a and a hard portion 1b that are arranged in the axial direction of the seal. The seal ring shown in FIG. 5A has a hard portion 1b sandwiched between soft portions 1a provided on both axial ends. The seal ring shown in FIG. 5B has a soft portion 1a sandwiched between hard portions 1b provided at both axial ends. The seal rings shown in FIGS. 5A and 5B are symmetric with respect to the transverse centerline, so that they can be mounted in either direction.

FIG. 6 shows another embodiment of the present invention. In this embodiment, the seal groove 5 forming the piston retraction means is narrower near its bottom. The outer-diameter portion of the piston seal 1 is fitted in the narrow portion of the seal groove with no gap formed therebetween or with a suitable interference to fix the piston seal 1 at its outer-diameter portion in the caliper 2. It is thus possible to prevent undue deformation of the seal at its inner-diameter portion while the fluid pressure is low. A gap g formed due to the difference in size h between the narrow and wide portions of the groove prevents the seal from being damaged by getting caught between the edge of the groove and the piston when the piston is inserted following the mounting of the seal.

The outer-diameter portion of the piston seal 1 fitted in the seal groove should represent about 25–70% of the depth L of the seal groove measured at its center. If this rate is lower than 25%, it is impossible to sufficiently restrain deformation of the seal. If over 70%, deformation of the seal is overly restrained, so that it will become difficult to increase the distance the piston is retracted when the fluid pressure is high.

If the opening of the narrow portion of the seal groove is closed by the piston seal 1 of FIG. 6 when the seal is inserted into the groove, the air in the groove, which cannot escape, will make it difficult to push the seal into the groove. Thus, it is preferable to provide the piston seal 1 with an air vent means such as at least one groove extending from the outer-to inner-diameter side of the seal as shown in FIG. 7, or a plurality of projections 10 as shown in FIG. 8. For the same purpose, holes may be formed that extend from the outer periphery of the seal to its end face. But such holes are difficult to form and thus less desirable than the groove and the projections shown in FIGS. 7 and 8.

According to the present invention, the distance the piston is retracted varies with the fluid pressure applied to the disk brake in an ideal manner. Thus, while the brake is not applied, the space between the pad and the disk is always kept constant, so that the dragging torque decreases without the possibility of increased play of the brake pedal or worsening of the pedal feeling.

The piston retraction means according to the present invention is especially advantageous for use in an automotive or motorcycle disk brake, because by reducing dragging torque, it is possible to improve fuel economy and brake pedal (or brake lever) operating feelings.

What is claimed is:

1. A disk brake assembly, comprising:

a caliper formed with a cylinder, said cylinder having an inner surface;

a brake piston mounted in said cylinder, said brake piston having an outer periphery and an end on which fluid pressure can act; and a piston retracting means for retracting said piston in said cylinder, said piston retracting means comprising a seal groove in said inner surface of said cylinder, said seal groove comprising an edge remote from the end of said brake piston on which fluid pressure can act, said edge having a chamfer, and a rubber piston seal fitted in said seal groove so as to be pressed against the outer periphery of said brake piston, forming a liquid tight seal of the space between said cylinder and said brake piston, said piston seal having an inner diameter portion having an inner peripheral surface and an outer diameter portion, and said seal groove having a depth;

wherein said piston seal is deformable from an original shape and is adapted to be pulled at said inner diameter portion thereof by said brake piston and resiliently deformed until said piston seal fills a gap defined by said chamfer when said brake piston is advanced to press a brake pad against a brake disk, and to resiliently move back to return to the original shape while retracting said piston when fluid pressure is released, and wherein said piston seal has said outer diameter portion thereof fitted in said seal groove such that 25–70% of the depth of said seal groove has said piston seal fitted therein with substantially no axial gap between said seal groove and said seal.

2. The disk brake assembly of claim 1, wherein 25–70% of the depth of said seal groove has said piston fitted therein with interference.

3. The disk brake assembly of claim 1, wherein said piston seal comprises an air vent passage extending from an inner periphery of said piston seal to an outer periphery of said seal in order to prevent axial movement of said piston seal.

4. A disk brake assembly, comprising:

a caliper formed with a cylinder, said cylinder having an inner surface;

a brake piston mounted in said cylinder, said brake piston having an outer periphery and an end on which fluid pressure can act; and a seal groove in said inner surface of said cylinder, said seal groove comprising an edge remote from the end of said brake piston on which fluid pressure can act, said edge having a chamfer; and a rubber piston seal fitted in said seal groove so as to be pressed against the outer periphery of said brake piston, forming a liquid tight seal of the space between said cylinder and said brake piston, said piston seal having an inner diameter portion having an inner peripheral surface and an outer diameter portion having an outer peripheral surface;

wherein said piston seal and said piston groove define a means for retracting said piston in said cylinder when fluid pressure is removed from acting on said piston in said cylinder after said piston has been advanced to press a brake pad against a brake disk by having said piston seal resiliently deform from its original shape by being pulled at said inner diameter portion thereof by said brake piston until said piston seal fills a gap defined by said chamfer between said chamfer and said piston seal when said piston seal has its original shape and by having said piston seal resiliently move back to return to the original shape while retracting said piston when the fluid pressure is removed; and wherein said piston seal has a structural arrangement selected from the group consisting of a) said piston seal being at least partially made of a rubber having a hardness not less than 80 IRH, and b) said piston seal having the outer diameter portion thereof fitted in said seal groove such that 25–70% of the depth of said seal groove has said piston seal fitted therein with substantially no axial gap between said seal groove and said piston seal.

5. A disk brake assembly, comprising:

a caliper formed with a cylinder, said cylinder having an inner surface;

a brake piston mounted in said cylinder, said brake piston having an outer periphery and an end on which fluid pressure can act; and a piston retracting means for retracting said piston in said cylinder, said piston retracting means comprising a seal groove in said inner surface of said cylinder, said seal groove comprising an edge remote from the end of said brake piston on which fluid pressure can act, said edge having a chamfer and a rubber piston seal fitted in said seal groove so as to be pressed against the outer periphery of said brake piston, forming a liquid tight seal of the space between said cylinder and said brake piston, said piston seal having an inner diameter portion having an inner peripheral surface and an outer peripheral surface;

wherein said piston seal is deformable from an original shade and is adapted to be pulled at said inner diameter portion thereof by said brake piston and resiliently deformed until said piston seal fills a gap defined by said chamfer when said brake piston is advanced to press a brake pad against a brake disk, and to resiliently move back to return to the original shape while retracting said piston when fluid pressure is released, and wherein said piston seal is at least partially made of a rubber having a hardness not less than 80 IRH; and wherein said piston seal has an axial direction and comprises two soft portions and one hard portion, said hard portion being sandwiched between said two soft portions.

* * * * *